United States Patent
Flament et al.

(10) Patent No.: US 6,843,648 B2
(45) Date of Patent: Jan. 18, 2005

(54) METHOD AND DEVICE FOR THE AUTOCOMBUSTION OF OILY ORGANIC WASTE, COMPRISING A TANGENTIAL HEATING FURNACE

(75) Inventors: Patrick Flament, Auffargis (FR); Pierre Lacaze, Leyme (FR); Mouloud Hendou, Bannes (FR); Christophe Teulet, Gramat (FR)

(73) Assignees: Institut Francais du Petrole, Rueil Malmaison Cedex (FR); Lacaze S.A., Leyme (FR)

( * ) Notice: Subject to any disclaimer, the term of this patent is extended or adjusted under 35 U.S.C. 154(b) by 56 days.

(21) Appl. No.: 10/149,376
(22) PCT Filed: Dec. 12, 2000
(86) PCT No.: PCT/FR00/03493
§ 371 (c)(1),
(2), (4) Date: Jun. 12, 2002
(87) PCT Pub. No.: WO01/44721
PCT Pub. Date: Jun. 21, 2001

(65) Prior Publication Data
US 2002/0192608 A1 Dec. 19, 2002

(30) Foreign Application Priority Data
Dec. 16, 1999 (FR) ............................................ 99 16302

(51) Int. Cl.$^7$ ................................................ F23C 5/32
(52) U.S. Cl. ............................ 431/9; 431/173; 431/187
(58) Field of Search ................................. 431/173, 9, 2, 431/4, 187, 8, 181

(56) References Cited

U.S. PATENT DOCUMENTS

| | | | | | |
|---|---|---|---|---|---|
| 2,707,444 A | * | 5/1955 | Van Loon | .................... | 110/264 |
| 2,725,950 A | * | 12/1955 | Christiansen | ................ | 422/182 |
| 4,515,093 A | * | 5/1985 | Beardmore et al. | ......... | 110/347 |
| 4,580,504 A | * | 4/1986 | Beardmore et al. | ......... | 110/261 |
| 4,782,770 A | * | 11/1988 | Carlson | ....................... | 110/264 |
| 6,019,595 A | * | 2/2000 | Wulfert et al. | .............. | 431/181 |
| 6,503,286 B1 | * | 1/2003 | Lacaze et al. | ................ | 44/301 |

FOREIGN PATENT DOCUMENTS

| | | | | | |
|---|---|---|---|---|---|
| BE | 540756 | * | 9/1955 | ............. | F22B/1/00 |
| FR | 2784387 A1 | * | 4/2000 | ............. | C10L/1/00 |

* cited by examiner

Primary Examiner—Henry Bennett
Assistant Examiner—James G. Barrow
(74) Attorney, Agent, or Firm—Antonelli, Terry, Stout & Kraus, LLP

(57) ABSTRACT

The present invention relates to a method and to a device intended for spontaneous combustion of a fuel comprising organic, vegetable or mineral materials, the device comprising a combustion chamber, at least one fuel injection means, at least one air inlet, hot fumes discharge means. Chamber (1) comprises a cylindrical shell (11), the discharge means comprise a pipe (6) having the same axis as the chamber and arranged inside said chamber, and fuel injection means (7) is arranged substantially tangential to said cylindrical shell so that the fuel follows a circular motion around said pipe in the chamber.

22 Claims, 4 Drawing Sheets

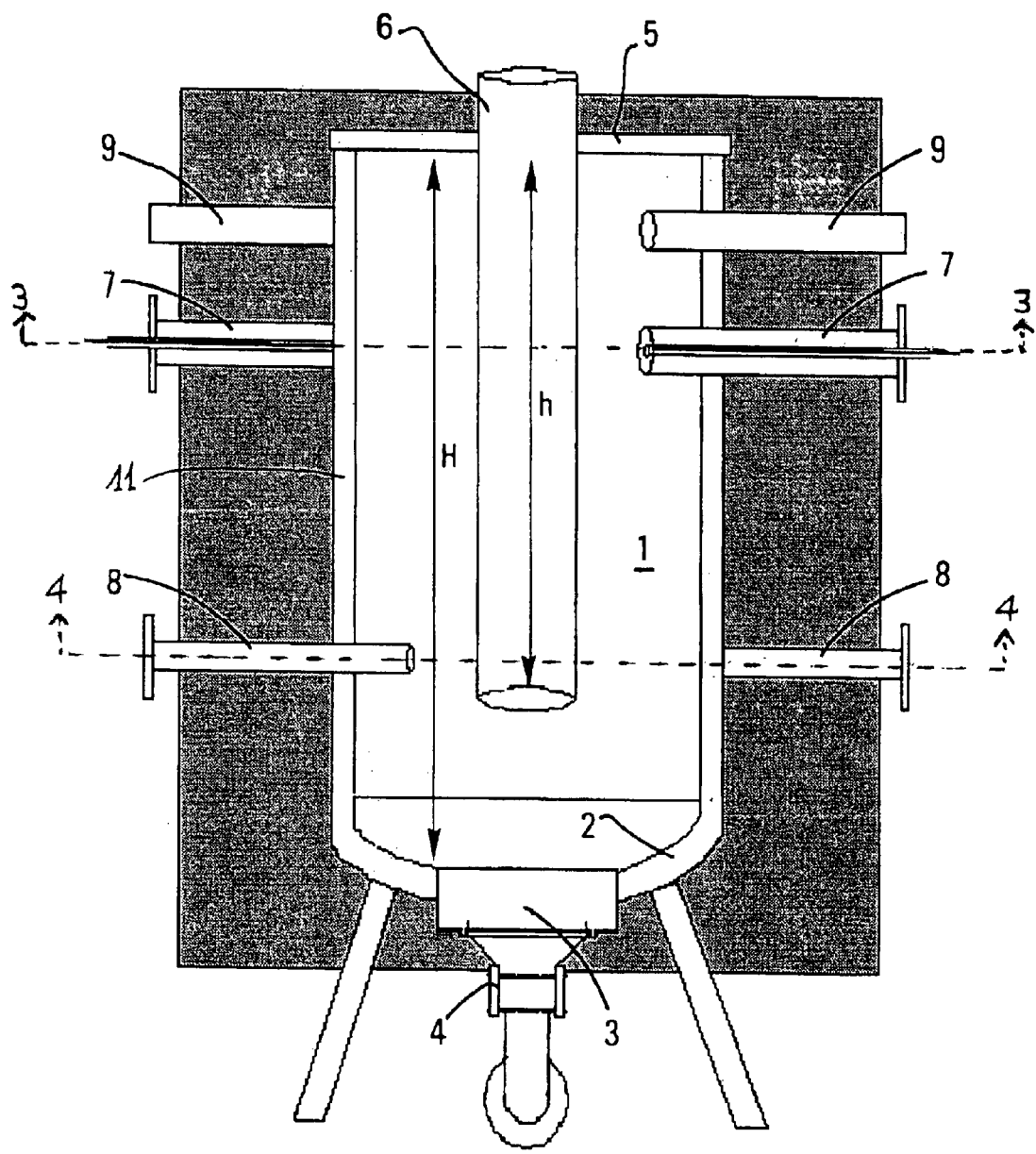

METHOD AND DEVICE FOR THE AUTOCOMBUSTION OF OILY ORGANIC WASTE, COMPRISING A TANGENTIAL HEATING FURNACE

FIELD OF THE INVENTION

The present invention relates to the field of combustion and notably of spontaneous combustion of organic and preferably greasy waste.

A particularly interesting application of the invention relates to the use of the combustion energy in a heat exchanger such as a hot water production device.

BACKGROUND OF THE INVENTION

French patent application FR-2,774,454 describes a water heating device comprising a firing chamber with a primary air inlet arranged below a combustion chamber. The firing chamber is equipped with a means intended to initiate the spontaneous combustion of the heterogeneous and preferably greasy waste. However, such a furnace, specifically suited for heterogeneous waste, notably has the drawback of requiring great care in handling the waste and of involving uncertain combustion regulation.

Organic waste such as meat flour or palmiped viscera poses difficult combustion problems because, once dried, the volatile matter content of these products is too high to allow direct burning in a conventional incinerator (grate destruction due to locally high temperatures). In a conventional furnace, the hot zones could be eliminated by using wet waste (50% water or more), but the geometry of these furnaces is not suited to allow correct recovery of all the radiation of the flames present in the combustion chamber, to warm the waste up and to efficiently eliminate the water contained therein. Spontaneous combustion is then no longer provided, which sooner or later results in a combustion stop.

SUMMARY OF THE INVENTION

The present invention affords the advantage of allowing to burn wet products while maintaining a self-sustaining flame. The problem of hot spots is solved by the presence of water which compensates for the high volatile matter content of the fuel.

Furthermore, the invention can allow complete automation of an industrial waste combustion plant.

As will emerge from the description hereafter, the improvement according to the invention notably lies in the specific design of the heating furnace, at the level of automatic functioning, of emissions and of energy recovery.

The present invention thus relates to a device intended for spontaneous combustion of a fuel comprising organic, vegetable or mineral materials, the device comprising a combustion chamber, at least one fuel injection means, at least one air inlet, hot fumes discharge means. The chamber comprises a cylindrical shell, the discharge means comprise a pipe having the same axis as the chamber and arranged inside said chamber, and the fuel injection means is arranged substantially tangential to said cylindrical shell so that the fuel follows a circular motion around said pipe in the chamber. The fuel injection means can be placed in the chamber at a distance from the end of the discharge pipe, and the length of said pipe in the combustion chamber can be determined to obtain a sufficient transit time of the products during combustion before they are discharged through said pipe.

The device can comprise two fuel injection means that are diametrically opposite.

The injection means can comprise three concentric tubes intended for injection of the fuel, of the fuel spraying air and of the combustion air.

The injection means can comprise a spray nozzle consisting of a disk pierced with a port allowing passage of the sprayed fuel jet, the shape of the disk being such that it can create swirls favouring mixing of the air and of the fuel in the chamber.

The combustion chamber can comprise at least one secondary air inlet opening onto the vicinity of the end of the discharge pipe.

The secondary air inlet can be substantially tangential to the shell and so oriented that the secondary air and the fuel move in opposite directions in the chamber.

There can be two diametrically opposite secondary air inlets.

Chamber preheating means can be arranged in the vicinity of the fuel injection means.

The preheating means can comprise inlets for hot air coming from burners.

The chamber can comprise, in the lower part thereof, means allowing recovery and discharge of the ultimate combustion residue.

The discharge pipe can cooperate with a heat exchanger, for example in order to provide hot water or steam.

In the device, the combustion air can be supplied by a fan, the fuel spraying air can be provided by a compressor and a pump can supply the injection means with fuel.

The fuel can be a mixture of water and organic, vegetable or mineral matter ground into bits whose average size is less than 10 mm and preferably less than 5 mm.

At least one additive can be added to the fuel in order to stabilize the mixture.

An amount of hydrocarbons can also be added in order to raise the mean NCV (net calorific value) of the mixture.

The organic matter of the fuel can come from greasy waste, from palmipeds for example.

The invention also relates to a method of generating heat energy by implementing the device described above, wherein the annular volume of the combustion chamber is determined to optimize combustion by adjusting the transit time of the hot gases.

According to the method, the composition and/or spraying of the fuel can be adjusted so as to have a sufficient amount of fine droplets and/or particles in order to optimize spontaneous ignition of the fuel.

Without departing from the scope of the present invention, any other heat and/or steam exchange means can cooperate with the spontaneous combustion device. The heat produced according to the invention can be used for heating water, steam, or any fluid. Any type of exchanger (tubular, plate exchangers or others) can be used. In general, the heat produced by the device according to the invention can be used in all industrial processes, for example thermolysis, or drying of industrial sewage or sludge.

BRIEF DESCRIPTION OF THE DRAWINGS

Other features, details and advantages of the present invention will be clear from reading the description hereafter, given by way of non limitative examples, with reference to the accompanying drawings wherein:

FIG. 1 is a longitudinal section of an embodiment of the invention,

DETAILED DESCRIPTION

Figure 3:
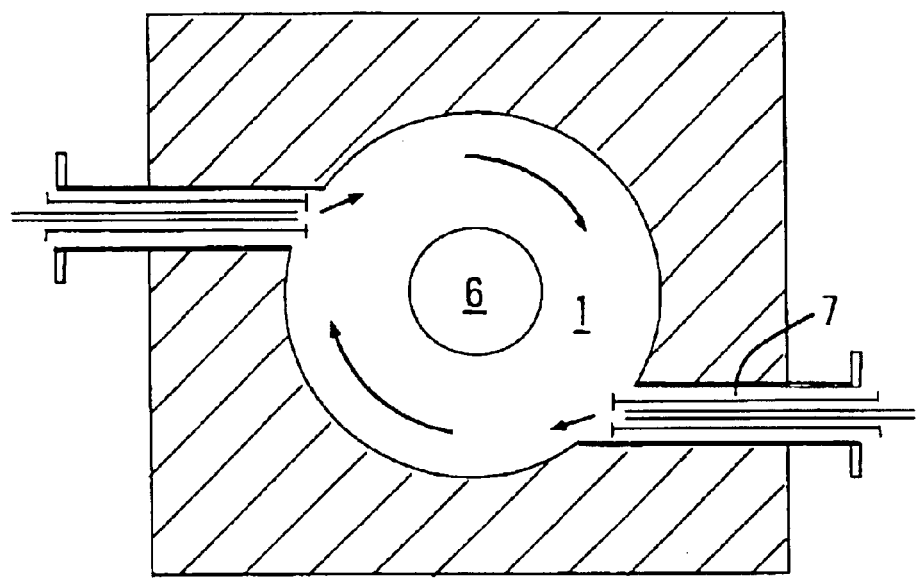
FIG. 3 is a cross-section of the furnace at the level of the fuel injection means along line 3—3 of FIG. 1.

FIG. 1 diagrammatically shows the main elements of the invention. The spontaneous combustion device comprises a preferably vertical combustion chamber 1. The chamber is cylindrical and comprises a concave bottom or base equipped with a hopper system 3 for recovery of the burned solids and discharge through a trap 4. The cylindrical chamber is closed at the upper end thereof by a plate 5 comprising substantially in its axis a pipe 6 serving as a stack pipe.

The fuel is injected into chamber 1 through at least one injection means 7 arranged substantially tangential to the chamber, so that the fuel follows a circular motion in the annular space provided between the outside of pipe 6 and the inside of chamber 1. The details of injection system 7 are described in connection with FIG. 2.

The chamber can comprise other air injection means 8, arranged for example below fuel injection means 7. These secondary air injection means are arranged substantially tangential to the chamber, but they are so oriented that the air follows a rotating motion in the opposite direction to that of the fuel injected through means 7.

Other inlets 9, generally arranged above and in the vicinity of the fuel injection means, allow the combustion chamber to be preheated, either by direct supply of hot gases coming from an external generator, or by one or more preheat burners located at inlets 9. These inlets can be tangential to the chamber or not. The main purpose of these preheat means is to initiate spontaneous combustion of the fuel injected.

The height of the chamber is H, the length of the stack pipe in the chamber is h.

Figure 2:
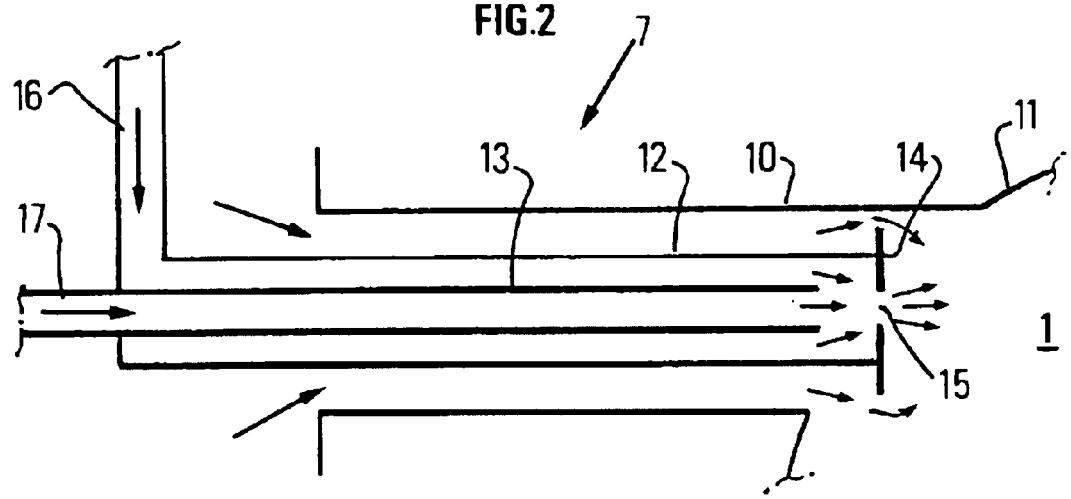
FIG. 2 is a longitudinal section of a fuel injection system.

FIG. 2 shows in detail fuel injection means 7.

The fuel can be in the gaseous, liquid or solid phase containing fatal-ashes or not, or a mixture of the three phases. The fuel can be of the type described in patent application FR-98/12,751 mentioned here byway of reference. The fuel is in form of an emulsion that can be easily transported and sprayed by pressurized air so as to obtain droplets and/or solid particles whose maximum diameter is less than 10 mm and preferably less than 5 mm, and the simultaneous presence of a sufficient amount of fine particles or droplets, whose diameter is for example less than or equal to 25 $\mu$m. An amount above about 2% is generally sufficient for spontaneous ignition.

FIG. 2 shows injection means 7 comprising a tube 10 secured to the wall 11 of combustion chamber 1. Inside this tube 10, two other tubes 12 and 13 are placed substantially along the same axis. Tube 12 is ended, on the combustion chamber side, by a disk or ring 14 provided with a port 15 through which the sprayed fuel jet is fed. Inner tube 13 opens onto the vicinity of port 15, at an optimum distance to allow spraying and efficient mixing of the combustible emulsion injected through the annulus between tubes 13 and 12 and of the pressurized fluid (air) injected through tube 13. Pipe 17 is connected to a pneumatic compressor, pipe 16 is connected to the fuel pumping means. Primary air that is injected independently of the fuel in order to control the combustion of the mixture in chamber 1 circulates between tubes 12 and 10.

Disk 14 allows to create sufficient swirls at the level of the fuel injection means to favour excellent air/fuel mixing.

FIG. 3 is a cross-sectional view of the chamber at the level of a pair of fuel injection nozzles 7. The arrows diagrammatically show the path of the gases and/or of the particles ignited in chamber 1.

The helical motion imparts a centrifugation phenomenon to the fuel, which allows the heavier (solid or liquid) particles to move towards the walls of the chamber. The transit time of these particles is thus increased by this centrifugation phenomenon and it can also be somewhat increased by a countercurrent secondary air injection. The transit time of the heavier particles can reach a few minutes, which allows total combustion and efficient extraction of the late volatile matter.

Figure 4:
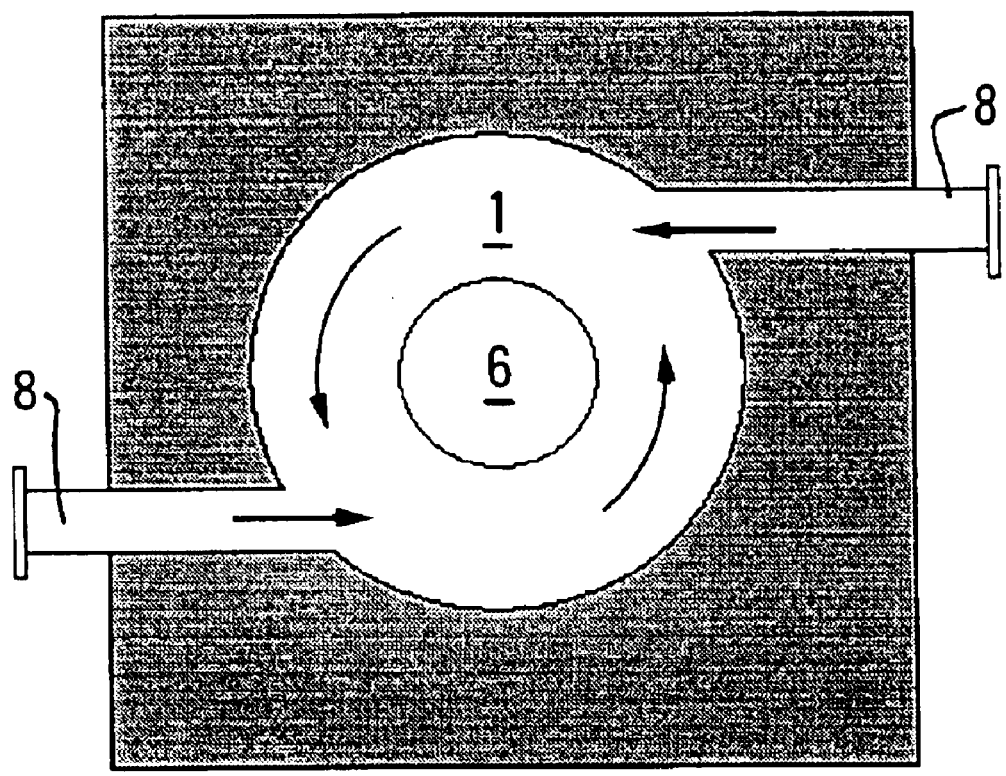
FIG. 4 is a cross-section of the heating furnace at the level of the secondary air inlets along line 4—4 of FIG. 1.

FIG. 4 shows the layout of the secondary air inlets in relation to the primary air inlets and to injection means 7. The direction of rotation of the air is here anticlockwise, whereas the ignited particles and/or gases flow down clockwise in a substantially helical motion in the chamber. Such a layout notably allows to partially stop the helical motion with high production of swirls that generates fast mixing of the secondary air and of the hot fumes, and favours mass and heat transfers by fluidization of the ashes.

The combustion effluents flow out through axial stack pipe 6, generally made of heat-resisting steel. The function of the stack pipe is fundamental for the operation of the equipment. It generates the radiative stream required for ignition of the fuel, it reduces the volume of chamber 1 by creating an annular space where combustion takes place so as to maintain a high and nearly constant velocity of the hot gases around the pipe. The convective stream flowing towards the well of the chamber is therefore considerable. The length h of the stack pipe in chamber 1 is determined in relation to the length H of the chamber in order to compel the hot gases to reach the furnace bottom. This retention zone plays a fundamental part. It must be very hot, properly supplied with oxygen and it must be able to retain the solid matter for several minutes in order to allow extraction of the late volatile matter and complete elimination of the carbon contained in the ashes. Combustion of the fuel generates ashes, and hopper 3 is provided to allow easy discharge of this mineral matter.

The radiative emission coefficient of a wall being by nature higher than that of gases, the stack pipe allows to transmit to the fuel an appreciable amount of the energy contained in the fumes. The high water content of the fuel (30 to 40%) requires a high energy supply in the vicinity of the fuel injection point. The combined effects of the radiation of the walls and of the hot gas circulations produced by disk 14 placed at the end of injection tube 12 allow to maintain a well-sustained flame at the outlet of injection means 7.

Figure 5:
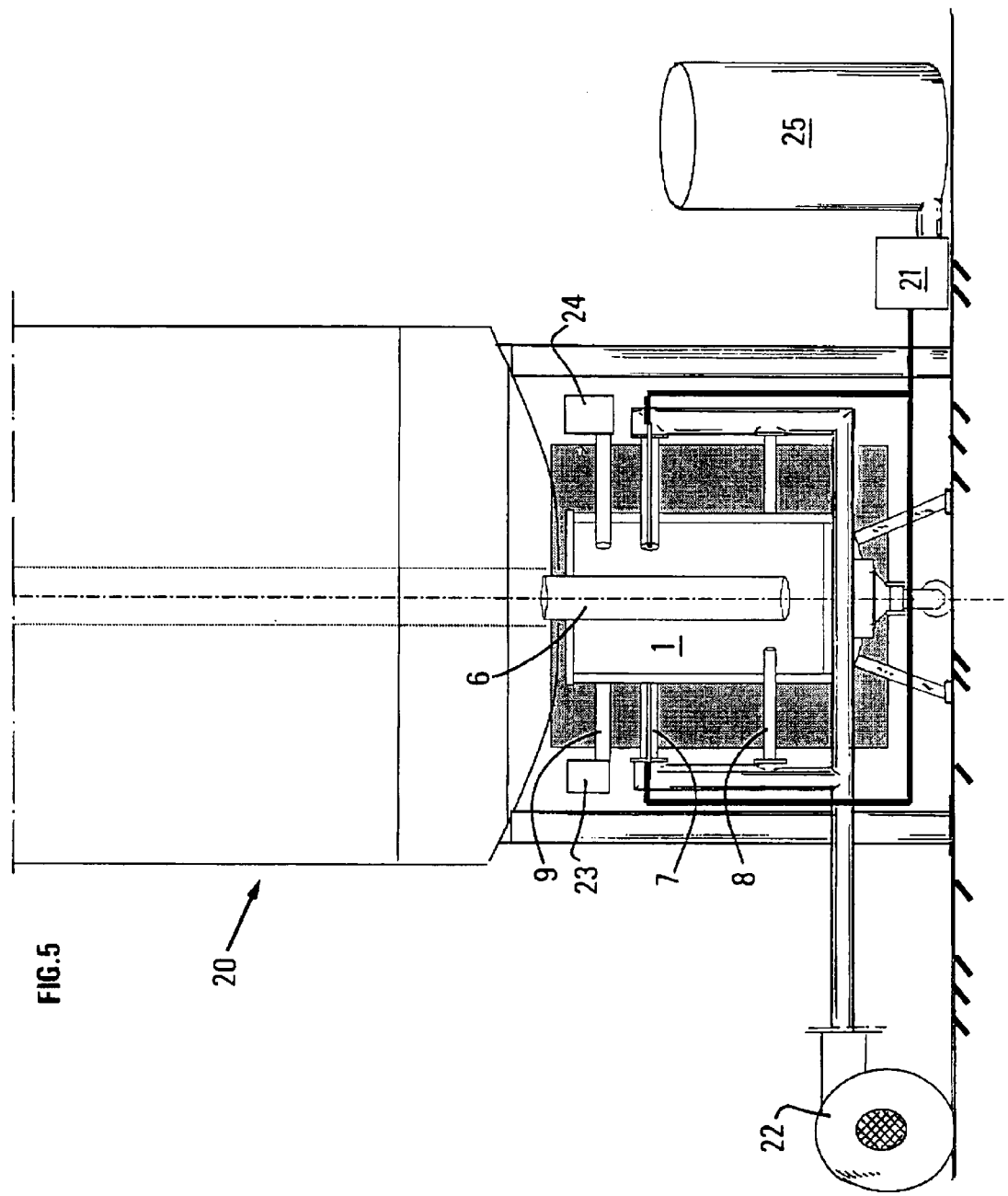
FIG. 5 is an overall view of a plant according to the invention.

As shown in FIG. 5, stack pipe 6 can cooperate with a heat-insulated hot water storage and production tank 20 through which stack pipe 6 runs along the axis thereof. A heat transfer is thus performed from the combustion fumes to the water contained in the tank. An air fan 22 supplies the primary air inlets 7 and secondary air inlets 8. Another compressor, not shown, provides air at a higher pressure for spraying of the combustible emulsion. A vessel 25 contains the combustible emulsion prepared by grinding, mixing of greasy waste in the presence of water and possibly of additives for emulsion stabilization. If the calorific value of the waste is not sufficient for optimum operation of the device according to the invention, the emulsion can be doped with hydrocarbons or other materials that can raise the mean NCV of the emulsion.

When the spontaneous combustion device according to the invention is thus coupled with a hot water production device, temperature detectors (no reference number) are then provided and cooperate with an automatic control device which can act on fan 22, fuel pump 21 or burners 23 and 24 in order to stop or to re-initiate the combustion according to the temperature of the water in the tank.

Automation of a hot water production device can also comprise an element such as a gas burner of industrial premix burner type, arranged at the bottom of tank 20, independently of combustion chamber 1. This element can be used as a safety in case the spontaneous combustion device comes to a standstill, for example when fuel starts running out, or when the heat-capacity rate of the waste is below the required energy supply. It is then an additional heat supply.

It is clear that the device is not limited to hot water production, and that its applications as a heat generator can be various and multiple.

The numerous series of tests carried out have allowed to determine the elements that are essential to obtain a good combustion with greasy waste; these elements are as follows:

- using a fuel that can be readily transported between the storage point and the burner, and possibility of dispersing it in a gaseous flow in form of droplets and of solid particles (maximum diameter below 5 mm),
- combustion system accepting liquid, solid and gaseous products as well,
- combustion system accepting solid or liquid particles (or droplets) that can be fifteen (15) times as big as the largest particles commonly encountered in combustion of heavy fuel oil or of pulverized coal,
- combustion system using a compressed air assistance in order to produce a sufficient fraction of fine droplets (~5 to 25 $\mu$m) required for good flame retention,
- combustion system allowing good mixing of the sprayed fuel and of the air in order to prevent coking,
- combustion system with continuous product supply,
- combustion system of high thermal inertia accepting great variations in the size of the droplets (or solid material) injected,
- combustion system providing both sufficient retention (for a few minutes) of the products that are the most difficult to burn (solid products and late volatile matter) and good supply of this retention zone with a stream of hot gases sufficiently rich in oxygen (typically 1000° C. and 9% $O_2$),
- combustion system allowing proper discharge of the ashes and with a good corrosion resistance to the fumes,
- combustion system providing a fumes residence time greater than or equal to two (2) seconds.

What is claimed is:

1. A method of generating heat energy, comprising combusting a fuel comprising organic vegetable or mineral material in a device comprising a combustion chamber, at least one fuel injection means, chamber preheating means provided in the vicinity of the fuel injection means, at least one air inlet, and hot fumes discharge means, said chamber comprising a cylindrical shell, said discharge means comprising a pipe having the same axis as the chamber and arranged inside said chamber, and the fuel injection means being arranged substantially tangential to said cylindrical shell so that the fuel follows a circular motion around said pipe in the chamber, wherein an annular volume of the combustion chamber is determined in order to optimize combustion by adjusting the transit time of the hot gases.

2. A method as claimed in claim 1, wherein the composition and/or spraying of the fuel is adjusted so as to have a sufficient amount of fine droplets and/or particles to optimize spontaneous ignition of the fuel.

3. A device intended for spontaneous combustion of a fuel comprising organic, vegetable or mineral materials, said device comprising a combustion chamber, at least one fuel injection means, chamber preheating means provided in the vicinity of the fuel injection means, at least one air inlet, and hot fumes discharge means, characterized in that said chamber comprises a cylindrical shell, said discharge means comprise a pipe having the same axis as the chamber and arranged inside said chamber, and the fuel injection means is arranged substantially tangential to said cylindrical shell so that the fuel follows a circular motion around said pipe in the chamber and comprises three concentric tubes intended for injection of the fuel, of the air allowing said fuel to be sprayed and of the combustion air.

4. A device as claimed in claim 3, wherein the injection means comprises a spray nozzle consisting of a disk pierced with a port allowing passage of the sprayed fuel jet, the shape of the disk being such that it creates swirls favouring air/fuel mixing in the chamber.

5. A device intended for spontaneous combustion of a fuel comprising organic or vegetable materials, said device comprising a combustion chamber, at least one fuel injection means, chamber preheating means provided in the vicinity of the fuel injection means, at least one air inlet, and hot fumes discharge means, characterized in that said chamber comprises a cylindrical shell, said discharge means comprise a pipe having the same axis as the chamber and arranged inside said chamber, and the fuel injection means is arranged substantially tangential to said cylindrical shell so that the fuel follows a circular motion around said pipe in the chamber, wherein the fuel is a mixture of water and of organic or vegetable matter ground into bits whose average size is less than 10 mm.

6. A device as claimed in claim 5, wherein the fuel injection means is arranged at a distance from the end of discharge pipe and the length of said pipe in the combustion chamber is determined to obtain a sufficient transit time of the products during combustion in the chamber before they are discharged through said pipe.

7. A device as claimed in claim 5, wherein two diametrically opposite fuel injection means are provided.

8. A device as claimed in claim 5, wherein the chamber comprises at least one secondary air inlet opening onto the vicinity of the end of the discharge pipe.

9. A device as claimed in claim 8, wherein said air inlet is substantially tangential to said shell and so oriented that the secondary air in the chamber moves in the opposite direction in relation to the motion of the fuel.

10. A device as claimed in claim 8, wherein there are two diametrically opposite air inlets.

11. A device as claimed in claim 5, wherein said preheating means comprise inlets for hot air coming from burners.

12. A device as claimed in claim 5, wherein the chamber comprises, in the lower part thereof, reception and discharge means intended for the ultimate combustion residue.

13. A device as claimed in claim 5, wherein the discharge pipe cooperates with a heat exchanger in order to provide hot water or steam.

14. A device as claimed in claim 5, wherein a fan provides combustion air, a compressor provides spraying air, a pump supplies the injection means with fuel.

15. A device as claimed in claim 5, wherein at least one additive is added in order to stabilize the combustible mixture.

16. A device as claimed in claim 5, wherein an amount of hydrocarbons is added in order to miss the moan net calorific value of said mixture.

17. A device as claimed in claim 5, wherein the organic matter comes from greasy waste.

18. A device as claimed in claim wherein the greasy waste comprises waste from palmipeds.

19. A device as claimed in claim 19, wherein the fuel is a mixture of water and of organic, vegetable or mineral matter ground into bits whose average size is less than 5 mm.

20. A device as claimed in claim 19, wherein at least one additive is added in order to stabilize the combustible mixture.

21. A device as claimed in claim 19, wherein an amount of hydrocarbons is added in order to raise the mean net calorific value of said mixture.

22. A device as claimed in claim 19, wherein the organic matter comes from greasy waste.

* * * * *